July 9, 1963  J. HENRY-BAUDOT  3,097,319

PRINTED CIRCUIT STATOR FOR ELECTRICAL ROTATING MACHINES

Filed Dec. 8, 1959

Inventor
Jacques Henry-Baudot
By Ralph B. Stewart
attorney

United States Patent Office 3,097,319
Patented July 9, 1963

3,097,319
PRINTED CIRCUIT STATOR FOR ELECTRICAL
ROTATING MACHINES
Jacques Henry-Baudot, Antony, France, assignor to
Printed Motors Inc., New York, N.Y.
Filed Dec. 8, 1959, Ser. No. 858,240
Claims priority, application France Dec. 13, 1958
5 Claims. (Cl. 310—179)

The present invention relates to improvements in electrical rotating machines in which the windings are at least partly made of so-called "printed" conductors and relates especially to the axial-gap type of machines such as disclosed in the co-pending application No. 691,434, wherein the stator part is made of at least one "printed" sectorial spiral formed over the face of a magnetic ring.

It is necessary to multiply or increase the number of turns of such a winding in order to obtain a suitable level or strength of magnetic flux, and it is obviously highly desirable that such a multiplication of the number of turns shall not involve the piling or stacking of a number of "printed" sectorial turn winding members which are electrically connected through dielectric insulating and supporting sheets. On the one hand, this would complicate the manufacture and, secondly, this would lower the efficiency of the stator member as in such machines it is important to have a magnetic airgap as small as possible in the axial direction. It may be said that, for the best approach to this latter condition, it would be desirable that the "printed" winding may be printed directly onto the magnetic (and insulating) material of the stator ring. Magnetic and insulating materials are now well known per se, such as ferrite materials.

According to the invention, there is provided a wound member for such machines as hereinbefore defined wherein over a ring of magnetic material is formed a printed winding pattern of a multiple-turn spiral of a conductor formed as a Greek fret of repeated sectorial design, the winding being connected between a single pair of supply terminals. At least one end of the winding may be connected to a terminal at the rear of the ring through a face-to-face interconnection on the ring.

Figure 1:
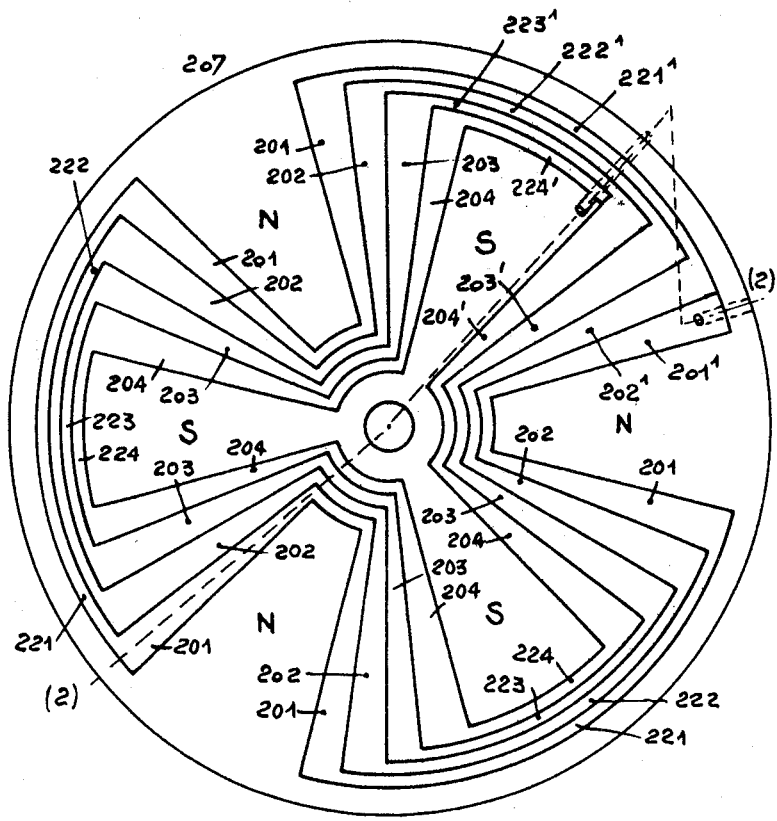
Figure 2:
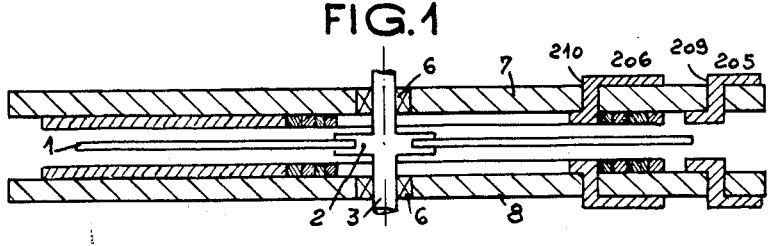

An illustrative embodiment of such a wound member is shown in FIG. 1, FIG. 2 showing a cross-section of an example of a machine embodying such a member.

For the sake of clarity in the drawing, the number of conductors or turns of the winding pattern is reduced to four, whereas, in actual practice, the number will obviously be much higher.

The example of FIG. 1 relates to a winding for a six-pole machine. The spiral winding is formed on one face of a supporting magnetic ring or disc 207. The poles of the winding are delineated by the six groups of four radial conductor sections, numbered from 201 to 204 for five out of six of these groups, and from $201^1$ to $204^1$ for the sixth group. Conductor section $201^1$ ends for instance in a straight-through connection 209 connected to a terminal 205 on the rear face of the supporting magnetic ring 207. Either this ring is made of a magnetic insulating material, as said, and the conductors printed on a plane surface thereof, or this ring is made of a spiralled magnetic strip and the wound ring is provided with a thin insulating film on the face bearing the winding conductors (the through-connections being insulated). Three groups of arcuate conductor sections ensure or form the inner end interconnections of the radial conductor sections and three other groups of arcuate conductor sections also ensure or form the outer end interconnections of the radial conductor sections; the said inner and outer groups of arcuate conductor sections being shifted or displaced relatively to one another for completing the spiral winding of multiple turns. Two of the outer groups of arcuate sections being numbered from 221 to 224 and the third, $221^1$ to $224^1$, is the outer arcuate conductor group leading to the radial conductor group $201^1$ to $204^1$. The arcuate conductor section $221^1$ is connected to radial conductor section $202^1$, the arcuate conductor section $222^1$, to radial conductor section $203^1$ and the arcuate conductor $223^1$ to conductor $204^1$. The arcuate section $224^1$ is connected to a straight-through connection 210 leading to a terminal 206 on the rear face of ring 207, see FIG. 2. Actually, only this latter straight-through connection is required in the member, since the input terminal of conductor section $201^1$ may be mounted, if so required, on the same face of ring 207 as the winding proper.

From FIG. 1 it will be easy to follow the four complete turn conductive spiral in the winding pattern from the outer end of radial section $201^1$ to the free end of arcuate section $224^1$.

As clearly shown in FIG. 1, each turn of the winding is spaced radially from adjacent turns, and each turn is formed of six sector-shaped open loops connected in series, the open ends of half of the loops facing toward the center of the carrier ring and the other loops facing outwardly of the ring. Also, the loops of adjacent turns are intermeshed with each other.

In FIG. 2 there are two such wound members as in FIG. 1 forming the stator of an electrical rotating machine having a rotor member 1 of disk-shaped type and formed for instance merely of a thin disk of an at least partially magnetic material. This rotor member 1 is supported by a hub 2 on shaft 3 which is journalled at 6. The wound stator members in FIG. 2 are numbered 7 and 8.

All conductor sections, the radial ones as well as the arcuate ones, are made contiguous in each group over the surface of the carrier ring, that is to say, the spacings between the conductor sections in these groups is very small and of a width necessary only to prevent contact between adjacent conductor portions and thereby avoiding stray paths of current therebetween. Such an arrangement, wherein each radial conductor section has a width increasing towards the periphery of the member, results in an efficient surface or area distribution of the radial conductor groups for defining the field distribution of axial direction in the machine according to the electrical current passing therethrough.

From the foregoing it will be understood that the thin and relatively broad conductor portions forming the multiturn winding are secured to a radial face of the magnetic carrier ring or member with the broad faces of the conductor portions in contact with the carrier member, and the radial face of the carrier member on which the winding is mounted presents a single-plane surface which is devoid of slots or grooves.

I claim:

1. For an axial air-gap electrical rotating machine, a stator winding member comprising a carrier ring of magnetic material and having a radial face formed as a single-plane surface, a multi-turn spiral winding carried on said single-plane face, each turn of said winding comprising a plurality of sectorial conductor loops serially interconnected and made of a thin and flat conductor coating on the carrier face to which it strongly adheres, said coating comprising groups of radial conductor portions of sector shape arranged in contiguous relation to each other in each group and separated only by narrow insulating gaps, polar areas being preserved between such groups of closely arranged radial conductor portions, and arcuate conductor portions alternately connecting the radial conductor portions of said groups at their inner and outer ends respectively.

2. A stator winding member according to claim 1, wherein one end at least of the winding is connected by a straight-through connection to a terminal carried on the rear face of said carrier ring.

3. A stator winding member according to claim 2, wherein the carrier ring is of a magnetic and insulating material and the conductive coating is applied directly onto the said material.

4. A stator winding member according to claim 2, wherein the carrier ring is of a magnetic and conducting material and an insulating film is inserted between the said material and the conductive coating forming the winding and face-to-face connections.

5. An electric winding comprising a disc-type carrier member having a flat radial face formed as a single-plane surface, a multi-turn winding carried on said single-plane face and comprising a thin and relatively wide conductor with its broad face adhering to said single-plane face and wound about the axis of said disc carrier a plurality of times, each turn being spaced radially from adjacent turns, and each turn being formed of a plurality of open-ended sectorial loops connected in series, half of said loops facing inwardly toward the center of said carrier and half facing outwardly, the loops of each turn being intermeshed with the loops of adjacent turns.

References Cited in the file of this patent

UNITED STATES PATENTS

| | | |
|---|---|---|
| 288,316 | De Ferranti | Nov. 13, 1883 |
| 1,630,757 | Perkins | May 31, 1927 |
| 2,157,094 | Beyerle | May 9, 1939 |
| 2,441,960 | Eisler | May 25, 1948 |
| 2,847,589 | Haydon | Aug. 12, 1958 |

OTHER REFERENCES

Publication: Electrical Manufacturing, page 86; "Magnetic Ferrites" by Schoenberg.